United States Patent

Feiten

Patent Number: 5,469,756
Date of Patent: Nov. 28, 1995

[54] FLEXIBLE ROBOT ARM

[75] Inventor: Wendelin Feiten, Neubiberg, Germany

[73] Assignee: Siemens Aktiengesellschaft, Munich, Germany

[21] Appl. No.: 211,581
[22] PCT Filed: Sep. 18, 1994
[86] PCT No.: PCT/DE92/00798
  § 371 Date: Apr. 8, 1994
  § 102(e) Date: Apr. 8, 1994
[87] PCT Pub. No.: WO93/06974
  PCT Pub. Date: Apr. 15, 1993

[30] Foreign Application Priority Data

Oct. 10, 1991 [DE] Germany ............ 41 33 605.4

[51] Int. Cl.⁶ ..................................... B25J 18/06
[52] U.S. Cl. ................. 74/490.05; 92/48; 901/22; 901/23
[58] Field of Search ............ 74/490.05; 92/48; 901/22, 23

[56] References Cited

U.S. PATENT DOCUMENTS

| | | | |
|---|---|---|---|
| 3,284,964 | 11/1966 | Saito | 901/27 X |
| 4,494,417 | 1/1985 | Larson et al. | 901/21 X |
| 4,661,039 | 4/1987 | Brenholt | 901/22 X |
| 4,784,042 | 11/1988 | Paynter | 92/48 X |
| 4,900,218 | 2/1990 | Sutherland | 901/21 X |
| 4,954,952 | 9/1990 | Ubhayakar et al. | 901/31 X |

FOREIGN PATENT DOCUMENTS

| | | | |
|---|---|---|---|
| 0017016 | 10/1980 | European Pat. Off. | |
| 837845 | 6/1981 | U.S.S.R. | 901/22 |
| 1294517 | 3/1987 | U.S.S.R. | 901/22 |
| 1484687 | 6/1989 | U.S.S.R. | 901/22 |
| 2141090 | 12/1984 | United Kingdom. | |
| 2171076 | 8/1986 | United Kingdom. | |
| 2228644 | 8/1990 | United Kingdom. | |

Primary Examiner—Allan D. Herrmann
Attorney, Agent, or Firm—Hill, Steadman & Simpson

[57] ABSTRACT

Flexible robot arms are required for manipulation in environments having difficult access, for example, areas having restricted environments and areas beset with obstacles. An apparatus having various basic elements which are flat, arranged one on top of the other so as to tilt and are connected to one another by means of joints is provided. Here, the individual basic elements are arranged along a stacking axis. Between the individual basic elements, adjusting members, e.g. air chambers are provided which make it possible to set a precise angle between the respective basic elements. Control logic and a control bus with an electric power supply ensure in each adjusting member that the predetermined position is maintained.

7 Claims, 2 Drawing Sheets

FLEXIBLE ROBOT ARM

BACKGROUND OF THE INVENTION

1. Field of the Invention

The present invention relates generally to robotics and more specifically to a flexible robotic arm.

2. Description of the Related Art

Currently, robots are being increasingly used in areas in which the precise and rapid reproduction of movement operations is important. Principally in the fields of industrial production, e.g. the automotive industry, robots are used to position and move tools, such as when paint-spraying and welding. By means of robots it is ensured that a specific degree of quality can be maintained for high volume production.

Usually, the robots used have arms which consist of a plurality of sub-elements connected to one another by joints. In order to carry out the expected movements, these arms require a correspondingly large room in which to maneuver and are not suitable for use in a restricted environment beset with obstacles.

SUMMARY OF THE INVENTION

It is an object of the present invention to provide an apparatus with which manipulations can be performed under spatially restricted conditions and which can be used as a robot arm.

It is another object of the invention to provide an apparatus capable of reaching any locations in the region of the trunk with the tip of the trunk.

It is a further object of the invention to provide an apparatus with a cavity inside the trunk that permits materials to be supplied and carried away directly at the point of use or provides for current connection cables to be attached.

The invention is explained in greater detail with reference to an exemplary embodiment having a hydraulic or pneumatic variant of the robot trunk and to the figures.

DETAILED DESCRIPTION OF THE PREFERRED EMBODIMENTS

Figure 1:
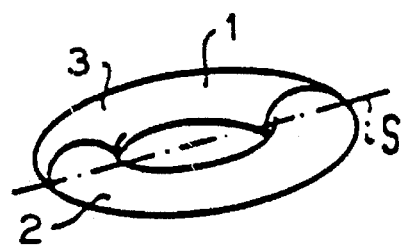
FIG. 1 illustrates an embodiment of a trunk element of the present invention.

FIG. 1 shows a trunk element 1 which is divided along an axis of symmetry S into trunk element segments 2 and 3.

The basic dement illustrated here is annular but it is also conceivable to use cake-shaped trunk elements or polygonal trunk elements which consist of a plurality of said segments and can also be divided up asymmetrically.

Figure 2:
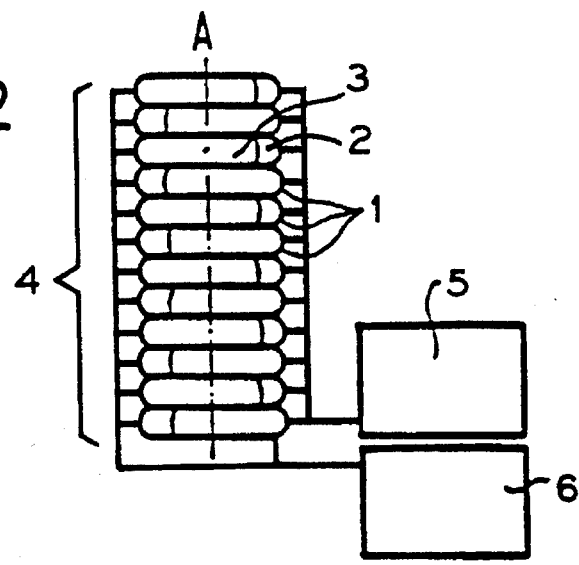
FIG. 2 illustrates a trunk of the present invention having a control and a power supply.

FIG. 2 shows a trunk 4 which consists of trunk clements 1 which are joined one on top of the other along a stacking axis A with a control 5 and a power supply 6. The control 5 in conjunction with the power supply 6 ensures that specific parameters such as: the angle of attack of the trunk clements 1 with respect to one another, electrical or magnetic field strengths and pressures in the trunk element segments 2, 3 can be determined and set. In FIG. 2, the decisive parameters in all the trunk element segments 2, 3 are identical so that the trunk 4 is located in a straight state.

Figure 3:
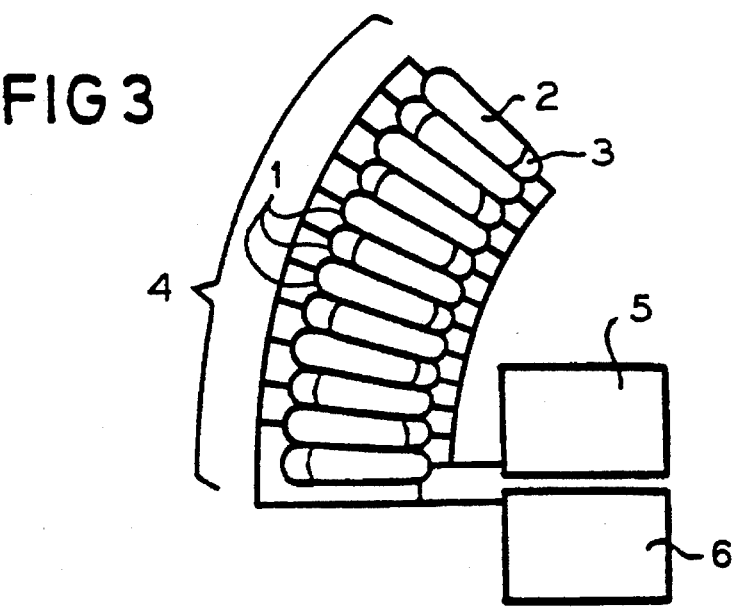
FIG. 3 illustrates a trunk of the present invention in a curved state.

FIG. 3 shows the trunk 4, which consists of the trunk elements 1 with segments 2, 3 and the control 5 and of the power supply 6, in a curved state. The curved state is achieved in that different actuation parameters, such as for example pressures, are set independently of one another in the trunk element segments 2, 3 of the trunk elements 1 in such a way that an angle of attack of the trunk elements 1 with respect to one another is achieved.

Figure 4:
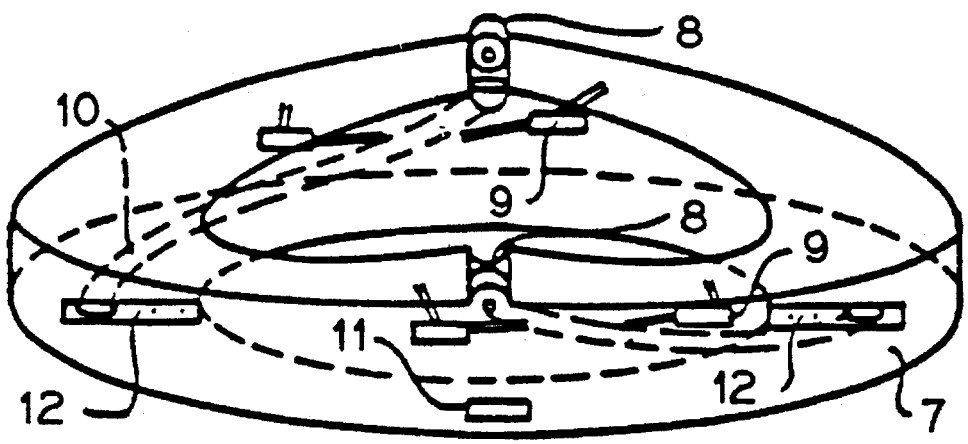
FIG. 4 illustrates an annular embodiment of a trunk element of the present invention.

FIG. 4 shows an annular trunk element 7 of the robot trunk 4. It is characterized by joints 8, valves 9 and hydraulic inflow and outflow lines 10 and by control logic 11 and 1 control bus 12 with electric power supplies. The annular trunk element 7 is not flat on its top but rather rises from both sides towards the joints 8 in a wedge shape.

If a plurality of such annular trunk elements 7 can be positioned one on top of the other and subsequently covered in a sealed fashion with rubber hoses on the inside and on the outside. Chambers, which are sealed by the joints 8, are thus produced between the individual annular trunk elements 7. In these chambers, the hydraulic inflow and outflow lines 10 which are driven by the valves 9 end. The control logic 11 together with the control bus 12 and the electric power supply 6 ensures that a defined state can be set separately in any individual chamber. This fact permits two annular trunk elements 7, which are located one on top of the other and are connected via the joint 8, to be placed in an exactly predeterminable oblique position with respect to one another.

Figure 5:
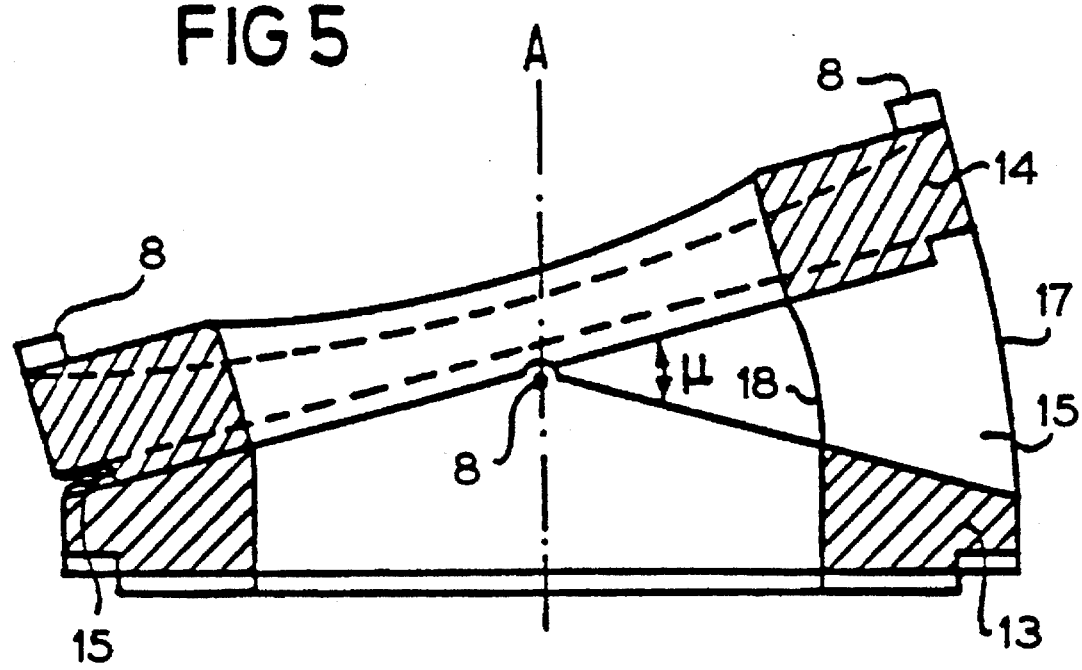
FIG. 5 illustrates an embodiment of two trunk elements of the present invention positioned on top of the other connected by a joint.

FIG. 5 shows an embodiment of two such trunk elements 13 and 14 which are positioned one on top of the other and are connected by a joint. Trunk element 14 is located with respect to trunk element 13 in an oblique position which is characterized by the angle μ, which is brought about by the fact that a first chamber 15 is filled and a second chamber 16 is empty, the chambers being formed by the hoses 17 and 18. The two trunk elements 13 and 14 are illustrated in the drawing FIG. 5 in a sectional view. The cutting plane is located in such a way that it contains the vertical stacking axis A of the trunk 4. Furthermore, the trunk element 14 is arranged rotated with respect to the trunk element 13 through 90° about the axis A.

Although other modifications and changes may be suggested by those skilled in the art, it is the intention of the inventor to embody within the patent warranted hereon all changes and modifications as reasonably and properly come within the scope of his contribution to the art.

I claim:

1. A flexible robot arm apparatus, comprising:

a plurality of trunk elements joined on top of each other along an axis to form a trunk, each element being divided, by at least one cutting plane in said axis of said trunk, into segments which can be expanded or compressed independently of one another in the longitudinal direction of said trunk;

means for controlling said expansion or compression, said control means separated from said arm;

means for supplying power to said arm apparatus, said power supply means separated from said arm; and said trunk elements being oriented in a mutually reversed array in said longitudinal direction of said trunk with respect to said axis so that a tip of said trunk can be comprehensively maneuvered by said separate expansion and compression of various said trunk element segments.

2. The apparatus of claim 1, wherein said trunk elements are hose-shaped and are divided into two said segments.

3. The apparatus of claim 1, wherein said expansion and compression occur via a force selected from a group consisting of: piezoelectric, electrostatic, magnetic, hydraulic and pneumatic forces.

4. The apparatus of claim 1, wherein said expansion and compression of said trunk element segments occur at least partially and independently of one another, via said control.

5. The apparatus of claim 1, wherein said control means is further defined by providing a local electronic control means for controlling predetermined parameters in said trunk element segments.

6. The apparatus of claim 1, wherein said trunk elements along said axis of said trunk are hollow.

7. The apparatus of claim 5, wherein said parameters are selected from a group consisting of: pressure, field strength, voltage and angle.

* * * * *